INVENTORS.
Joseph L. Arrowood
Wayne A. Groppe
BY
ATTORNEY.

INVENTORS.
Joseph L. Arrowood
Wayne A. Groppe
BY
ATTORNEY.

United States Patent Office 3,500,023
Patented Mar. 10, 1970

3,500,023
STUTTER COUNTING CIRCUIT FOR A DIGITAL CONTROL SYSTEM
Joseph L. Arrowood and Wayne A. Groppe, Oak Ridge, Tenn., assignors to the United States of America as represented by the United States Atomic Energy Commission
Filed Nov. 9, 1966, Ser. No. 593,600
Int. Cl. G06m 3/12
U.S. Cl. 235—92                           4 Claims

ABSTRACT OF THE DISCLOSURE

A stutter counting circuit has been provided for use in a digital positioning control system in which command pulses from a computer are stored in a counter, and the counter, in turn, controls a drive means attached to a device to be positioned. A feedback generator associated with the device to be positioned feds back pulses to the counter, through the stutter counting circuit. The stutter counter operates upon the feedback signal before it is received by the counter to remove stutter pulses from the feedback signal, thus giving the counter true-position-indication feedback signals.

---

The invention described herein was made in the course of, or under, a contract with the U.S. Atomic Energy Commission.

This invention relates to numerical control systems of the digital type and more specifically to an improved pulse counting circuit employed in continuous-path, linear- interpolation control systems.

In digital control systems for very precise positioning of a device such as a gauging or sensing device, the device being positioned will at times "chatter" or stutter. That is, the device being positioned will jump forward and backward a number of times, usually in increments of a few thousandths of an inch. Provided the device being positioned has a feedback generator associated therewith, the feedback generator will emit successive trains of "forward" and "backward" pulses. A similar result occurs if the device is subject to vibration. The higher the resolution of the feedback generator, the larger the number and the shorter the duration of stutter pulses. If the signal fed back to the control counters is to be an accurate measure of the actual gauge or sensing device position, the stutter pulses must be removed from the signal.

To be more specific, assume that the numerical control system is calling for forward desired direction movement of a gauge head which is being controlled. Assume also that the gauge head has generated 1000 "forward" pulses in advancing from a reference position to its present position. Assume that the gauge head stutters, moving backward sufficiently to generate eight "backward" pulses and then moving ahead to generate three "forward" pulses. In the absence of some kind of correction circuitry, the control system would interpret all of these pulses to be generated by movement in the desired direction, i.e., the "forward" direction. Actually, the gauge head has moved from the 1000-pulse position to the 992-pulse position, and then to the 995-pulse position. What is needed is means to remove the eight "backward" (undesired-direction) pulses from the feedback signal so that they will not be interpreted as "forward" pulse.

In addition to removing the eight "backward" pulses, some means is needed to remove the next eight "forward" pulses generated by forward movement of the gauge head from the 992 position. Elimination of these eight "forward" pulses will permit the machine to return the gauge head to the 1000-pulse position without feeding back any additional pulses into the control counters. Assuming that the gauge head has been returned to that position and that eight "backward" pulses and eight "forward" pulses have been removed as described, the present position of the gauge head (the 1000-pulse position) corresponds to the number of feedback pulses (1000) received thus far by the control counters. If the gauge head now is advanced to the 1001 position, another "forward" pulse will be generated. This pulse, number 1001, would be fed back to the control counter in the usual manner.

It is, therefore, an object of this invention to provide a stutter counting circuit in a digital control system to ensure accurate positioning despite the occurrence of stutter.

Another object of this invention is to provide a stutter counting circuit for a digital control system which senses and stores undesired-direction pulses and eliminates them before feeding back the count to a main counter.

Further, it is an object of this invention to provide a stutter counting circuit for a digital control system which will feed back desired-direction pulses in the absence of undesired-direction pulses.

Still another object of this invention is to provide a stutter counting circuit for a digital control system which is relatively simple and inexpensive to construct and reliable in operation.

Briefly, the invention comprises a novel stutter counting circuit for the improvement of a computer controlled system in which command pulses from the computer are stored in a counter, and the counter, in turn, controls a drive means attached to a device to be positioned. A feedback generator associated with the device to be positioned feeds back pulses to the counter, through the stutter circuit, which removes stutter pulses from the feedback signal, thus giving the counter true position indication feedback signals.

The stutter counting circuit comprises a pulse sorter which is responsive to pulses from a feedback generator for sorting forward and backward pulses onto separate output lines. The outputs from the sorter are fed to an input gate system which is controlled by a direction sensing control devices connected to the gate system. The output of the gate system is connected to an up-down counter which stores undesired-direction pulses in the up-portion of the counter until they are counted down by successive desired-direction pulses. To complete the circuit, an output gate is provided, coupled to the counter and the direction control, for passing forward pulses when no pulses remain stored in the counter.

Various other objects and advantages of the invention will become apparent from the following detailed description and accompanying drawings, wherein.

Figure 1:
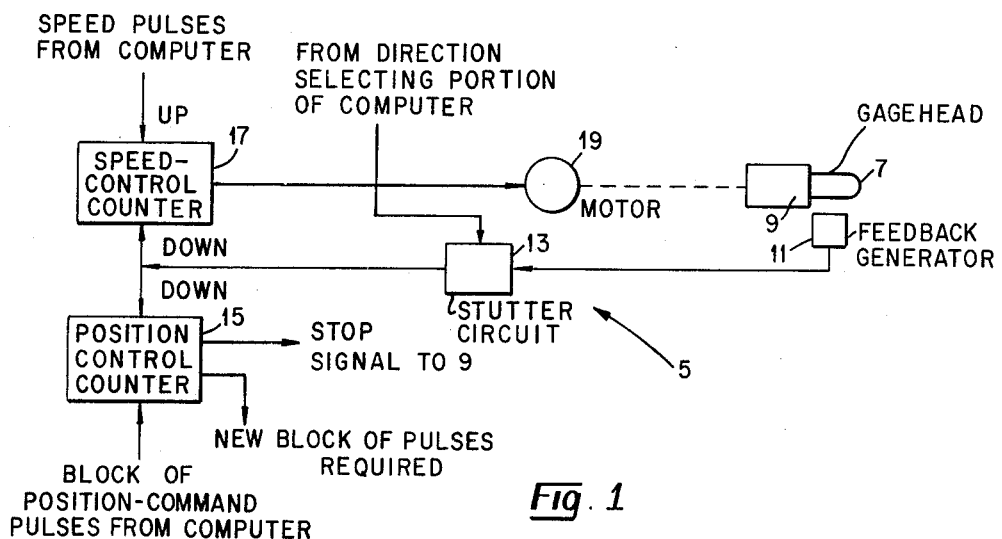
FIG. 1 is a block diagram of a digital control system employing the stutter counting circuit of the present invention.

Referring to FIG. 1, for the purpose of illustration only, there is shown a digital control system 5 which actuates a gauge head 7 mounted on an assembly of linearly movable machine slides 9. The slide is provided with a feedback generator 11 which continuously generates a feedback signal indicative both of the instantaneous position and the instantaneous direction of motion of slide 9. The feedback signal consists of voltage pulses, each of which represents the same amount of movement of the slide. The output from feedback generator 11 is fed into the subject stutter circuit 13 (to be described) along with a direction command from a computer (not shown).

Under certain conditions, the stutter circuit removes some of the pulses from the feedback signal. The remaining pulses constitute the output from stutter circuit 13; these are impressed on both a position-control counter 15 and a speed-control counter 17.

The computer periodically stores in position-control counter 15 a block of counts (command pulses) corresponding to a desired increment of movement of slide 9. The feedback pulses from stutter circuit 13 count down the stored command pulses one-by-one until the stored count is reduced to zero, at which time the command increment of movement will have been accomplished. Position-control counter 15 then generates a signal which stops movement of slide 9. The counter also sends a signal to the computer, calling for a new block, or increment, of command pulses.

As shown, the stutter counter output also is impressed on speed-control counter 17. The speed-control stores "speed" pulses received from the computer, and these pulses are counted down, one-by-one, by the incoming pulses from the stutter circuit. The resultant output signal from speed-control counter 17 ultimately is employed at the drive signal for slide 9 through a motor 19.

Figure 2:
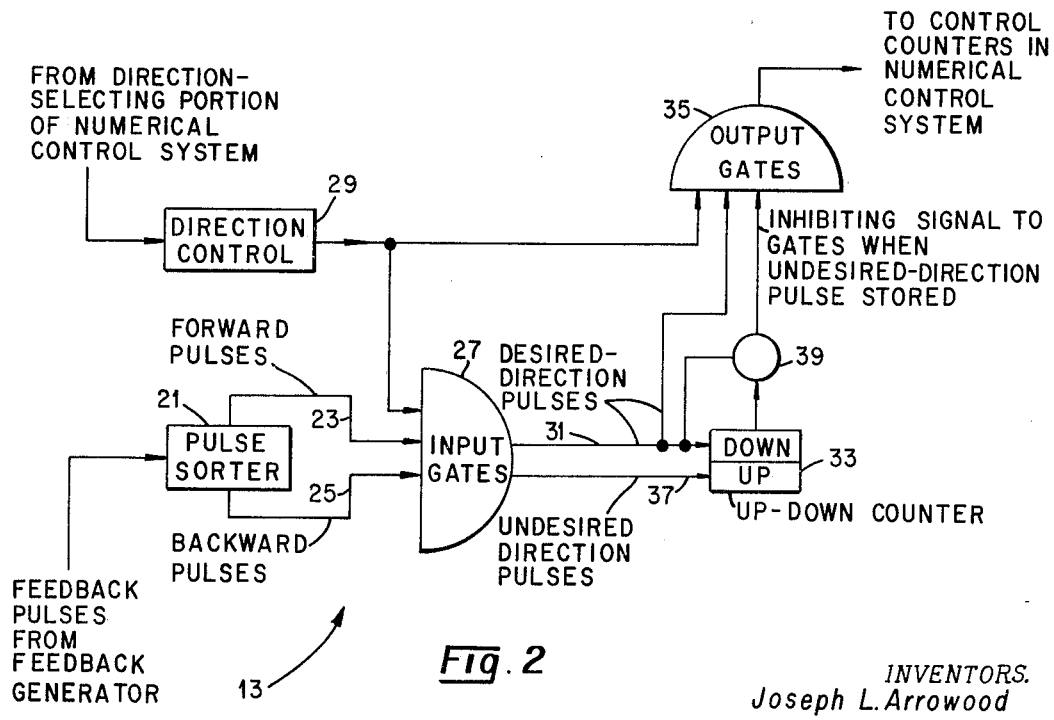
FIG. 2 is a block diagram of a stutter counting circuit according to the present invention.

Referring now to FIG. 2, stutter counter 13 is illustrated in block form. The blocks include a pulse sorter 21 which is connected to receive the output from feedback generator 11 (FIG. 1) and to direct "forward" pulses onto an output line 23 and "backward" pulses onto an output line 25. Pulse sorter 21 is a standard pulse-reversal detector such as the Janus Control Corporation, Bi-directional Polarity and Control Module, Model No. B100–85, and in many systems may be a phase comparator. The outputs from the sorter are fed to an input gate system 27 (to be described).

A direction control circuit 29, which may be a standard flip-flop or other binary output device, is connected to the computer to sense whether the system is currently calling for a "forward" or a "backward" movement. If, for example, the desired direction of movement is "forward," direction control 29 enables input gate system 27 to impress "forward" feedback pulses onto line 31, which is connected to the subtractive ("down") part of a standard up-down counter 33 and to an output gate system 35, consisting of standard "AND" gates. Simultaneously, direction control 29 enables input gate system 27 to impress any "backward" feedback pulses onto line 37, which is connected to the additive ("up") part of counter 33.

The output line from counter 33 is coupled, through a specially provided circuit 39 (to be described), to output gate system 35 and to line 31, which is the input line to the "down" part of counter 33. When no counts are stored in the "up" part of counter 33, circuit 39 places a voltage on line 31 to inhibit operation of the "down" part of counter 33 and enables output gate system 35. As a result, any "forward" pulses on line 31 are passed to control counters 15 and 17 (FIG. 1).

If a "backward" pulse appears on line 37, it is stored in the "up" part of counter 33, which responds by removing the inhibiting voltage from line 31 and disabling output gate system 35. If a "forward" pulse now appears on line 31, it is not passed by gate system 35, but is admitted to the "down" part of counter 33, where it reduces the stored counts by one. When sufficient "forward" pulses have been admitted to "count down" the stored pulses to zero, any additional "forward" pulses are passed to the main counter as already described.

Figure 3:
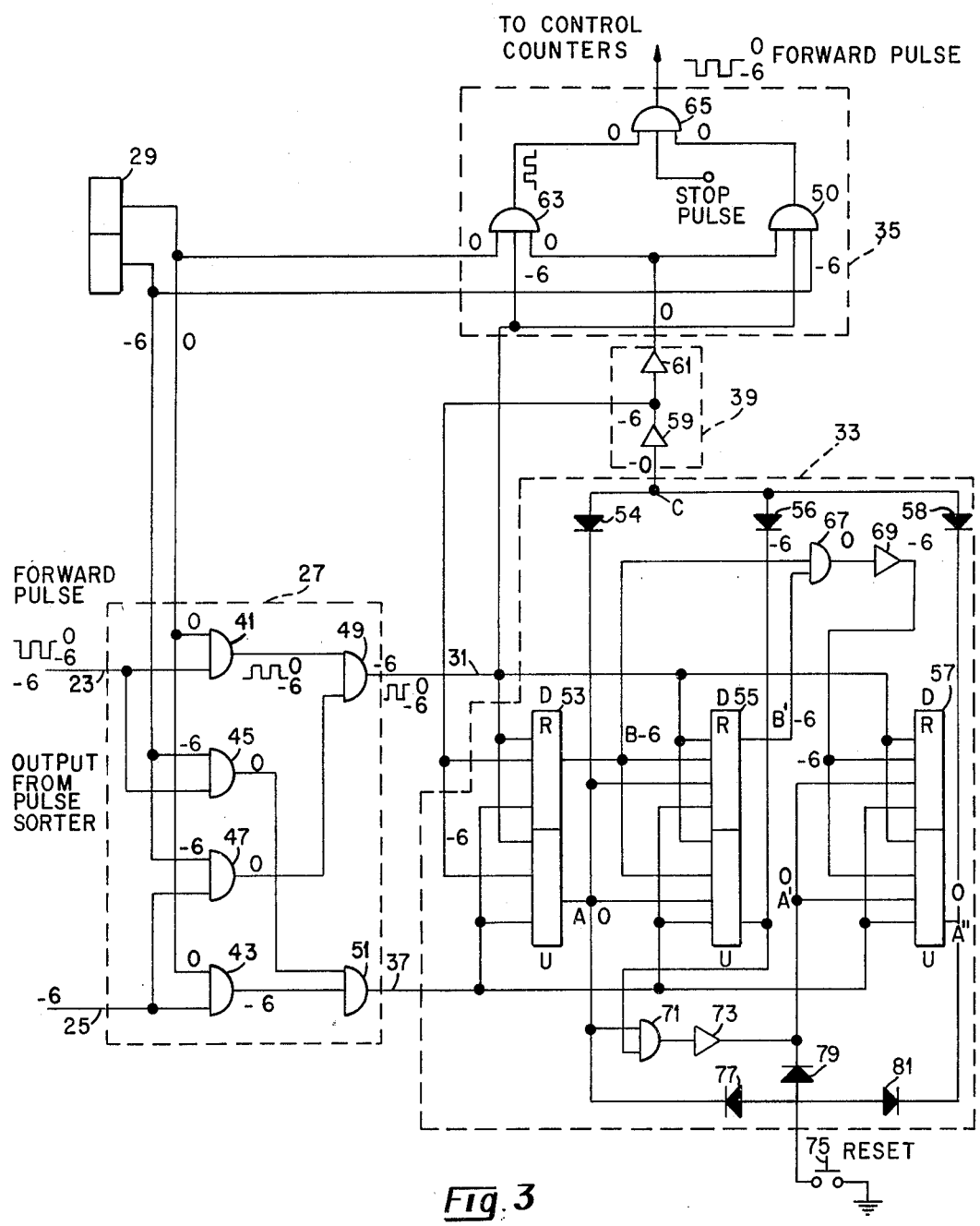
FIG. 3 is a schematic diagram of one embodiment of the present invention.

FIG. 3 illustrates one form of the subject circuit of FIG. 2 in more detail, with the exception that pulse sorter 21 (FIG. 2) is not shown and the elements of FIG. 2 are enclosed in dotted lines and numbered correspondingly. As indicated, direction control 29 is a standard flip-flop having outputs of zero and −6 volts. In this particular arrangement, the direction control is connected into the computer to go set if the computer calls for a slide movement in the forward direction. When set, the direction control enables "NOR" gates 41 and 43; it also inhibits "NOR" gates 45, 47, and "AND" gate 50 of output gate system 35. The voltages now prevailing in the circuit are indicated in FIG. 3. As indicated, the various input gates have an output of −6 volts when enabled, and zero volts when inhibited "NOR" gate 49 connected to the outputs of gates 41 and 47 is enabled while "NOR" gate 51 connected to the outputs of gates 43 and 45 is inhibited.

Referring momentarily to up-down counter 33, it comprises in this embodiment a standard multiple-stage arrangement of solid-state "OR"-gated flip-flops 53, 55, and 57 whose outputs (see terminals A and B) are either at −6 volts or zero. At this time the flip-flops are in the reset state, indicated by R; the output terminal A of flip-flop 53 is at zero; and consequently, the common output terminal C of the counter is at zero. Output terminal C is connected to output terminals A, A' and A" through counter stage isolating diodes 54, 56 and 58, respectively. A standard inverter 59 of circuit 39 is connected to point C and generates an output of −6 volts in the present illustration. This output is fed back to the inputs of flip-flop 53, inhibiting the down section of that stage while it enables the up section. The output of inverter 59 is connected through another standard inverter 61 to inputs of "AND" gate 50 and another "AND" gate 63, both of output gate system 35. Output gate system 35 further includes a third "AND" gate 65 which is connected to the outputs of gates 50 and 63, and further has a third input for receiving a stop pulse input from position-control counter 15 of FIG. 1. At this time, it will be noted, gate 63 is inhibited by the −6 volt output of gate 49, which is connected to inputs of both gates 50 and 63.

If at the same time a "forward pulse appears on line 23 of the pulse sorter, the pulse will be passed and inverted by gates 41, 49, 63, and 65. Note that gate 63 is enabled when the output of gate 49 goes from −6 volts to zero. The output from gate 65 will be a "forward" (desired-direction) pulse identical to the input to the stutter counter circuit. This pulse is impressed on the position-control counter 17 (FIG. 1).

If now a "backward" pulse appears on line 25, it will be passed and inverted by gates 43 and 51 in turn. The pulse passed by gate 51 sets the first stage (flip-flop 53) of counter 33, storing one count in the "up" (U) section of that stage. Terminal A of that stage now goes to −6 volts, driving the output of inverter 59 to zero. This removes the inhibiting voltage from the "down" section of the first stage and also places an inhibiting voltage (−6 volts) on both output gates 50 and 63.

If a "forward" pulse now appears on line 23, it will be impressed on the first stage (flip-flop 53) of counter 33 and on output gates 50 and 63 as previously described. The pulse will not be passed to counters 15 and 17, since gates 50 and 63 are now inhibited, but it will reset the first stage of counter 33, returning the circuit to its original state. That is, the "forward" pulse has "counted down" the preceding "backward" pulse. Thus, the stutter counter circuit 13 has met the objective discussed above. If the next pulse received is a "forward" pulse, it will be passed into counters 15 and 17, as previously described.

Assume that a single "backward" pulse has been received. This sets flip-flop 53, drives point A to −6 volts and point B to zero, and inhibits the "down" part of flip-flop 53. If a second "backward" pulse now is received, flip-flop 53 resets and in turn sets the second stage (flip-flop 55), storing a count in its up section. Now two "forward" pulses will be required to count the counter down to zero. A third successive "backward" pulse will set flip-flop 53, with flip-flop 55 remaining set; this represents a stored count of three. It should be noted that this count enables flip-flop 57 to be set on the next "backward"

pulse. This is accomplished by a standard component such as a "NAND" gate 67 (a gate which provides an enabled output only when both inputs are inhibited) whose inputs are connected to outputs B and B', respectively, and whose output is connected to the input of an inverter 69. The output of inverter 69 is connected to flip-flop 57, thereby transmitting a shift pulse to enable flip-flop 57 to set. Further, a "NAND" gate 71, whose inputs are connected to outputs A and A', respectively, and whose output is connected to another inverter 73 having its output connected to flip-flop 57 transmits a shift pulse enabling flip-flop 57 to be reset or counted down provided a count is stored in flip-flop 57. For convenience, only three counter stages have been shown in FIG. 3; three stages will store a maximum of seven counts in the binary system. More counter stages can be provided, of course, although a large number will not be required since the number of successive undesired-direction pulses will be comparatively small.

Transient-gated (capacitor-coupled) counter stages are employed so that the "forward" pulse which brings the counter 33 down to zero is not transmitted through output gate 63, which is being enabled simultaneously. Standard transient gating avoids this possibility by ensuring that it is the trailing edge (zero volts going to −6 volts) of the pulse from gate 49 which causes the resetting of flip-flop 53. Thus, the pulse is gone by the time the enabling signal from inverter 59 is impressed on gate 63.

The foregoing discussion has assumed that no −6 volt "stop" pulse has been placed on output gate 65 and that counter 33 was initially reset for initial operation (FIG. 3). Applying a "stop" pulse (derived from position-control counter 15, FIG. 1) isolates the position-control counter 15 from any stutter which might occur during the time that this counter is requesting a new block of commands from the computer. Passage of a stutter pulse into the counter at this time would cause errors. Any suitable switching means such as the reset switch 75, shown in FIG. 3, connected to flip-flops 53, 55 and 57 through isolating diodes 77, 79 and 81, respectively, is provided to reset or clear the stutter circuit of any stored counts.

The stutter circuit has been described above in terms of "forward" pulses being the desired-direction pulses. It will be apparent, that, if the control system calls for movement in the opposite direction, the direction control circuit 29 will automatically ready the circuit to store "forward" pulses as the undesired-direction pulses and the desired direction pulses will be passed and inverted by gates 47, 49, 50 and 65.

Thus it can be seen that a stutter counting circuit for a digital control system has been provided which senses direction of desired motion called for by the system; in the absence of undesired-direction pulses, passes desired-direction pulses to a main counter; stores any undesired-direction pulses; and, when any number "n" of undesired-direction pulses are so stored, passes no desired-direction pulses to the main counter until "n" desired-direction pulses have been eliminated from the feed-back signal.

It will be understood that various changes in the details and arrangement of parts which have been herein described and illustrated in order to explain the nature of this invention may be made by those skilled in the art within the principles and scope of this invention as expressed in the appended claims.

What is claimed is:

1. A stutter counting circuit for a digital control system, comprising: a pulse sorter responsive to pulses from a feedback generator for sorting "forward" and "backward" pulses onto first and second outputs, respectively; a binary control circuit for sensing the desired direction of pulses called for by said digital control system and having first and second outputs for "forward" or "backward" desired direction indication, respectively; input gates including first and second "NOR" gates, each having a first input connected commonly to said first output of said pulse sorter, each of said first and second "NOR" gates having a second input connected, respectively, to said first and second outputs of said binary direction control circuit, third and fourth "NOR" gates, each having a first input connected commonly to said second output of said pulse sorter, each of said third and fourth "NOR" gates having an input connected, respectively, to said first and second outputs of said binary direction control circuit, fifth and sixth "NOR" gates, for providing separate outputs for "desired" and "undesired" direction pulses, said fifth "NOR" gate connected to the outputs of said first and fourth "NOR" gates, and said sixth "NOR" gate connected to the outputs of said second and third "NOR" gates; an up-down counter having first and second inputs connected to the outputs of said fifth and sixth "NOR" gates, respectively; an output gate means having a plurality of inputs, a first of said inputs being connected to the output of said binary direction control circuit for enabling said output gate means; and circuit means connected between second and third inputs of said output gate means and respective outputs of said input gates and said up-down counter, whereby desired-direction pulses are fed directly to said output gate means when there are no undesired pulses stored in said up-down counter.

2. A stutter counting circuit for a digital control system as set forth in claim 1 wherein said up-down counter is a multiple stage "OR" gated flip-flop counter having first and second inputs connected respectively to the outputs of said fifth and sixth "NOR" gates.

3. A stutter counting circuit for a digital control system as set forth in claim 2 wherein said output gate means includes a first "AND" gate connected to the output of said circuit means for passing "forward" desired direction pulses responsive to said control circuit, having its first output connected to an input of said first "AND" gate, a second "AND" gate connected to the output of said circuit means for passing "backward" desired direction pulses responsive to said control circuit having its second output connected to an input of said second "AND" gate, and an output "AND" gate connected to the outputs of said first and second "AND" gates for passing desired-direction pulses applied thereto, said output "AND" gate having an input for receiving an inhibiting signal external of said stutter circuit.

4. A stutter counting circuit for a digital control system as set forth in claim 3 wherein said circuit means includes a first inverter connected to the output of said counter, a feedback connection connected between the output of said first inverter and said first input of said counter, a second inverter connected to the output of said first inverter, and a by-pass connection connected between the output of said fifth "NOR" gate and separate inputs of said first and second "AND" gates for passing "desired" direction pulses to said output gate means when no undesired-direction pulses are stored in said counter.

References Cited

UNITED STATES PATENTS 3,353,161 11/1967 Toscano _____ 340—172.5
3,414,718 12/1968 McElroy _____ 235—92

MAYNARD R. WILBUR, Primary Examiner

J. M. THESZ, JR., Assistant Examiner

U.S. Cl. X.R.

235—151.11; 318—20